(No Model.)

L. HENKLE.
WICK RAISER.

No. 348,970. Patented Sept. 14, 1886.

Attest.
N. Adams
M. McDermott

Inventor:
Leonard Henkle,
pr R. F. Osgood,
Atty.

UNITED STATES PATENT OFFICE.

LEONARD HENKLE, OF ROCHESTER, NEW YORK.

WICK-RAISER.

SPECIFICATION forming part of Letters Patent No. 348,970, dated September 14, 1886.

Application filed February 17, 1886. Serial No. 192,172. (No model.)

*To all whom it may concern:*

Be it known that I, LEONARD HENKLE, of the city of Rochester, in the county of Monroe and State of New York, have invented a certain new and useful Improvement in Wick-Raisers; and I do hereby declare that the following is a full, clear, and exact description of the same, reference being had to the drawings accompanying this application.

My improvement relates to raisers for circular wicks in Argand and similar lamps, and is of that kind where a band having spurs embraces the wick, and is provided with a handle which extends to the top of the lamp, the wick resting around a tube that extends up to the burner.

The invention consists of a wick-raiser composed of a handle, and a flexible band or strip provided at one end with sockets or openings, at the other with catches, the whole being so arranged that the band can be wrapped around the circular wick, and the catches be engaged with the sockets, thereby making a tubular holder, all as hereinafter described.

Figure 1:
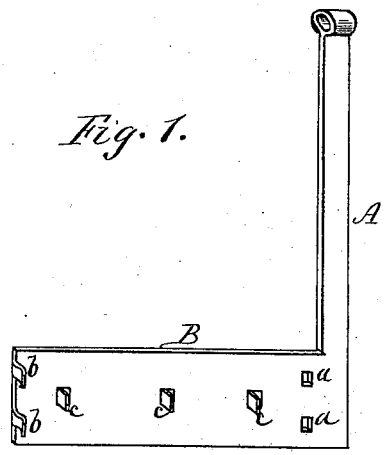
Figure 2:
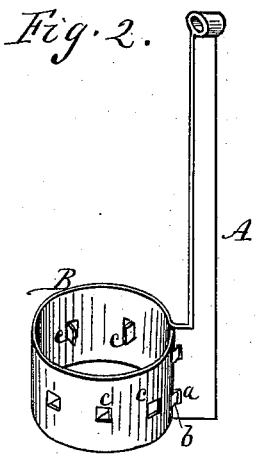
Figure 3:
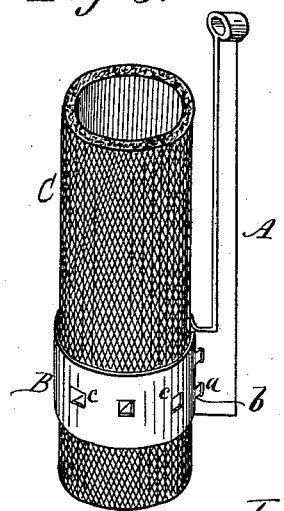

In the drawings, Figure 1 is a perspective view of the device in the open or extended form. Fig. 2 is a similar view in the closed form, but without the wick. Fig. 3 is a similar view with the wick in place.

A indicates the handle, and B the flexible strap or band which constitutes the holder. These parts may all be made together or each separately and secured together. In its natural state the band B springs out into the straight form shown in Fig. 1. The band is provided at the end next to the handle with one or more sockets or openings, *a a*, and at the outer end with one or more corresponding curved catches, *b b*. When the band is bent round in the circular form shown in Fig. 2, the catches pass into the sockets and lock the ends together, thus making a circular holder. The band is also provided with spurs *c c*, which stand inward and catch into and hold the wick. These spurs may be made on the edges or in the body of the band, but preferably the latter, as shown, and may be cut out and turned in from the sides of the band itself. C is the wick, of usual form. The advantage of this arrangement is that it is simply and cheaply made and affords great advantages over the old form of stiff and closed holder, as this band can be readily wrapped around the wick to secure it, and it can be as readily detached without loss of time and without soiling the fingers.

Having described my invention, what I claim as new, and desire to secure by Letters Patent, is—

The wick-raiser herein described, consisting of a handle and a flexible band, the band provided with one or more sockets at one end and one or more catches at the other, whereby the band can be wrapped around the wick and the ends be detachably connected, as set forth.

In witness whereof I have hereunto signed my name in the presence of two subscribing witnesses.

LEONARD HENKLE.

Witnesses:
R. F. OSGOOD,
P. A. COSTICH.